United States Patent [19]

Chiarottino

[11] Patent Number: 4,463,351

[45] Date of Patent: Jul. 31, 1984

[54] SYSTEM FOR PROVIDING SEVERAL DATA TERMINALS WITH ACCESS TO A DIGITAL TELEPHONE LINE

[75] Inventor: Volmer Chiarottino, Villanova Can-se, Italy

[73] Assignee: Cselt Centro Studi E Laboratori Telecomunicazioni S.p.A., Turin, Italy

[21] Appl. No.: 357,276

[22] Filed: Mar. 11, 1982

[30] Foreign Application Priority Data

Mar. 12, 1981 [IT] Italy ............................... 67345 A/81

[51] Int. Cl.³ ............................................. H04Q 9/00
[52] U.S. Cl. .................................... 340/825.5; 375/7;
178/3; 370/85
[58] Field of Search ........................ 340/825.5, 825.51;
178/3; 375/7; 370/85, 94

[56] References Cited

U.S. PATENT DOCUMENTS

| 3,978,451 | 8/1976 | Ito ............................................. 375/7 |
| 4,292,623 | 9/1981 | Eswaran et al. ................. 340/825.5 |
| 4,359,731 | 11/1982 | Beauford et al. .............. 340/825.51 |
| 4,375,639 | 3/1983 | Johnson, Jr. ..................... 340/825.5 |
| 4,395,710 | 7/1983 | Einolf, Jr. et al. ............... 340/825.5 |

Primary Examiner—Donald J. Yusko
Attorney, Agent, or Firm—Karl F. Ross; Herbert Dubno

[57] ABSTRACT

A line loop designed for the transmission of digitized voice samples as well as data words between an exchange and several subscriber terminals, not all of them necessarily equipped for voice communication, is connected through a modem to a bus with parallel branches extending to all the terminals, each branch including an outgoing-data lead, an incoming-data lead and two ancillary leads carrying clock pulses for the timing of data transmission and reception which are generated at the exchange. Each terminal, identified by a multibit address, is provided with an interface including a carrier sensor which detects the free or busy state of the line—during a time slot assigned to data transmission—on the basis of a certain protocol according to which an idle state is denoted by an unbroken succession of at least seven bits of predetermined logical value (here "1"). When a given terminal is ready to send out a message, a buffer store in the interface is enabled by the carrier sensor in the free state of the line to emit successive address bits which are compared to the instant line voltage for the possible coincidence of such a bit with a higher-priority bit ("0" in this instance) from another terminal. If so, the address emission is aborted; if there is no conflict, or if the terminal here considered prevails on every address bit, the line is seized for the transmission of the following data message to the exchange.

5 Claims, 4 Drawing Figures

SYSTEM FOR PROVIDING SEVERAL DATA TERMINALS WITH ACCESS TO A DIGITAL TELEPHONE LINE

FIELD OF THE INVENTION

My present invention relates to a telecommunication system wherein an exchange communicates via a common line with several terminals equipped for the transmission and reception of data. Preferably, the line here contemplated is a two-wire loop designed for handling not only data but also digitized voice samples emitted by and destined for telephone subscribers served by the same exchange.

BACKGROUND OF THE INVENTION

Recent developments in integrated circuitry, enabling the economical manufacture of filters, coding/decoding (codec) circuits, line interfaces and the like, have facilitated the conversion of outgoing voice samples from analog to digital form and the reconversion of incoming digitized samples to analog form at the subscriber end of a telephone line; this, in turn, allows the use of such a line for both voice communication and data transmission. Reference in this connection may be made to a report published October 1980 by the European Communication Commission (CEPT), titled "First Report of CEPT Special Group on ISDN (GSI)", with ISDN standing for "Integrated-Services Digital Network".

Thus, a subscriber line of such a network may operate at a rate of 80 kbit/sec accommodating a 64-kbit/sec voice channel and a so-called Δ channel available for data transmission and signalization. More particularly, a time slot of 125 μs can include a voice byte, a data bit and a synchronizing bit. This corresponds to a rate of 8 kbits/sec for data meassages, though a possible doubling of that bit rate is also contemplated.

The Δ channel, carrying the signalization, must be accessible to all terminals whereas the voice channel is to be used only by a telephone station or possibly by a terminal designed for high-rate data transmission. The remaining terminals can use the Δ channel for the transmission of data at the aforementioned low rate. The signalization present on the latter channel, incidentally, also serves for the assignment of the voice channel to a particular subscriber.

Whereas data transmission on the voice channel is also carried out in the form of 8-bit words or bytes, data carried on the Δ channel are generally grouped into messages or packets in conformity with a high-level protocol of HDLC type. See, in this connection, a 1976 draft by the International Organization for Standardization (ISO/DIS 4335) titled "Data communication—High-level data-link control procedures—Elements of procedures". With the particular protocol there envisaged, the release of a channel previously seized for data transmission is indicated by an unbroken succession of at least seven bits of logical value "1". Reference may also be made to an article titled "Packet Switching in Radio Channels" by Leonard Kleinrock and Fouad A. Tobagi, IEEE Transactions on Communications, Vol. COM-23, No. 12, December 1975, describing a carrier-sensing multiple-access system.

In a system of the type referred to above, with a number of data terminals given random access to a Δ channel of a telephone line, it is necessary to provide means for preventing a collision between messages from two or more terminals concurrently ready for transmission. Even when the channel is found to be idle, several terminals may simultaneously seek access, thereby creating a conflict.

In the so-called Aloha system, described by Norman Abramson and Franklin F. Kuo in Computer-Communication Networks published 1973 by Prentice-Hall, Inc., the problem of possible interference between concurrently transmitted messages is solved by blocking the transmission of any overlapping packets and thereafter attempting their retransmission at different times. As the likelihood of collision increases with the number of potentially competing terminals, the channel may remain unused for extended periods in a system of this type.

OBJECT OF THE INVENTION

The object of my present invention, therefore, is to provide improved means for solving the problem of access to a common data channel by a plurality of terminals communicating with a common exchange in, say, a telephone system of the digital type discussed above.

SUMMARY OF THE INVENTION

In accordance with my present invention, each of several terminals equipped for the transmission and reception of data over a common line comprises a processing unit which communicates with that line by way of an associated interface, the latter being coupled to the line via a two-way bus including an incoming-data lead, an outgoing-data lead and at least one signal lead carrying clock pulses that are generated at the exchange connected to the opposite end of the line; each of these leads has branches extending in parallel to all the terminals. The interface of each terminal comprises activity-sensing means with a data input connected to the outgoing-data lead and with a control input connected to the signal lead for ascertaining the free or busy state of the line from signal levels detected in a predetermined number of consecutive time slots assigned to data transmission. An outgoing message is loadable by the processing unit into storage means of the interface connected to a message transmitter which is inserted into the outgoing-data lead. The emission of such a message, preceded by an invariable address code, is initiated by logical circuitry in response to a command from the processing unit and in the presence of a line-free signal from the activity-sensing means, the storage means being controllable by the incoming pulses to emit successive bits of the address code in consecutive time slots before sending out the message itself. A comparator with inputs respectively connected to the outgoing-data lead at points upstream and downstream of the message transmitter serves to detect a possible coincidence of an address bit with a higher-priority bit from another terminal and for halting the emission of further bits in the presence of such coincidence.

In commonly owned copending application Ser. No. 318,254, filed by me jointly with two others on Nov. 4, 1981, there has been disclosed and claimed a system for the exchange of messages among a multiplicity of processing units interconnected by a data channel and a service line. According to that copending application, whose disclosure is hereby incorporated by reference into the present one, an interface associated with each processing unit includes a comparator with inputs connected to a transmitting branch and a receiving branch of the service line in order to detect a possible difference between the logic levels of an outgoing address bit and an incoming address bit concurrently appearing on that line. In the specific instance described there, as in the preferred embodiment of my present invention, an address bit of logical value "0" prevails over one of logical value "1"; the selection of the level of "0" as the dominant one has the advantage that it allows the incoming lead to be grounded by any interface through a transistor of the open-collector type. It should also be noted that, in my present system, the absence of activity on the outgoing-data lead common to all terminals can be denoted by at least seven consecutive bits of the nondominant level, i.e. of logical value "1" in conformity with the aforementioned document ISO/DIS 4335.

In contradistinction to the disclosure of the copending application, however, my present system does not require a separate service line; moreover, the interfaces of all terminals are synchronized by the clock pulses originating at the exchange and thus lack the individual time bases of the earlier system.

BRIEF DESCRIPTION OF THE DRAWING

The above and other features of my invention will now be described in detail with reference to the accompanying drawing in which:

FIG. 4 shows details of an activity sensor illustrated in block form in FIG. 2.

SPECIFIC DESCRIPTION

Figure 1:
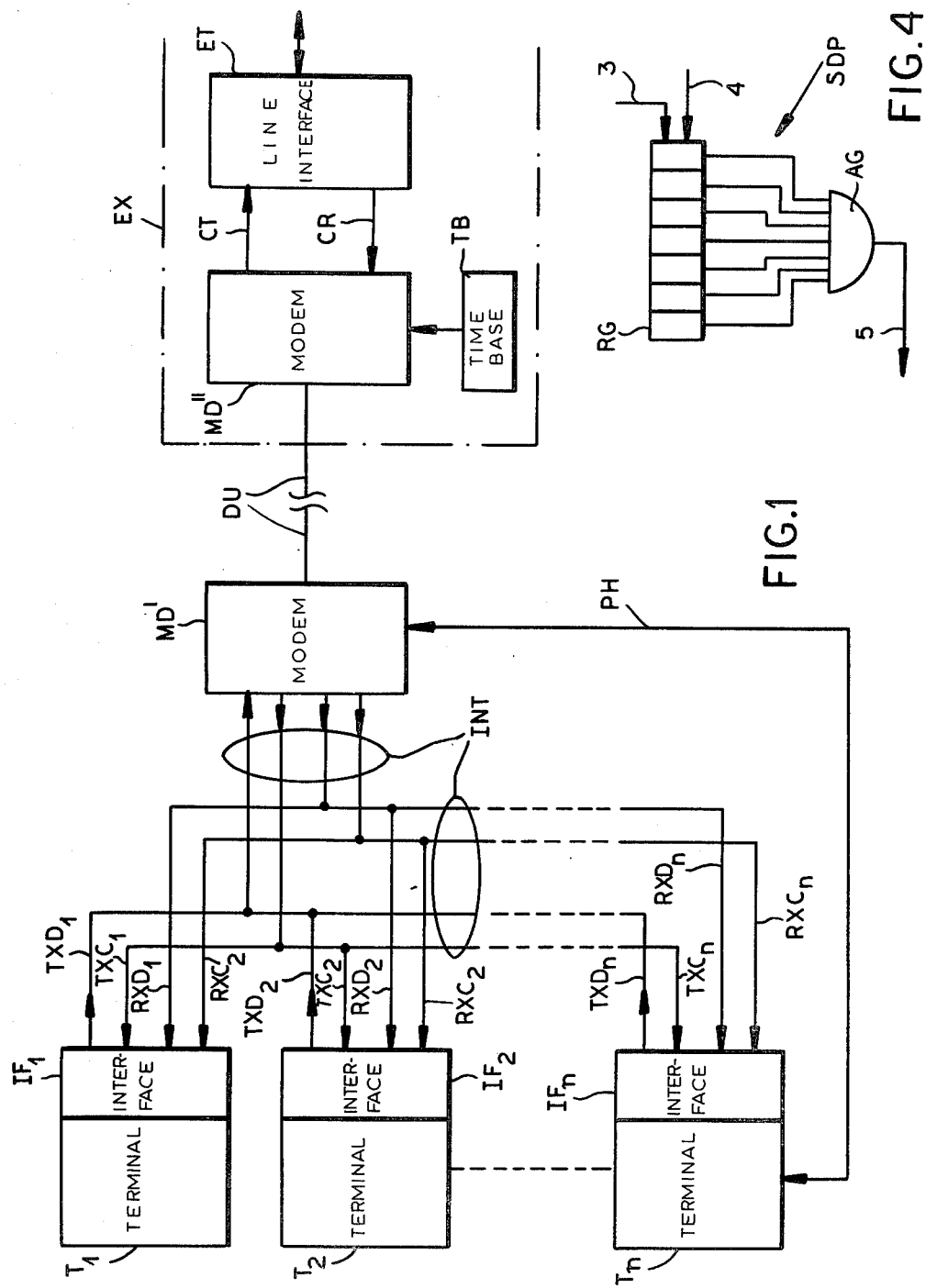
FIG. 1 is a block diagram giving an overview of a telecommunication system according to my invention, including a multiplicity of terminals dialoguing with an exchange.

As shown in FIG. 1, an exchange EX communicates via a conventional line loop DU with a number of terminals $T_1, T_2 \ldots T_n$ each including a respective interface $IF_1, IF_2 \ldots IF_n$ connected to line DU via a bidirectional bus INT and a modem MD'. Another modem MD" within the exchange EX is linked by a transmitting connection CT and a receiving connection CR to a conventional line interface ET which is coupled to the usual switching stages not shown. The exchange further includes a time base TB working into modem MD".

Bus INT includes one transmitting lead and three receiving leads each having a multiplicity of branches connected in parallel to all the interfaces, i.e. an outgoing-data lead with branches $TXD_1, TXD_2 \ldots TXD_n$, an associated signal lead with branches $TXC_1, TXC_2 \ldots TXC_n$ carrying transmission-controlling clock pulses, an incoming-data lead with branches $RXD_1, RXD_2 \ldots RXD_n$, and an associated signal lead $RXC_1, RXC_2 \ldots RXC_n$ carrying reception-controlling clock pulses. The two clock-pulse trains emitted by time base TB may be relatively offset to account for the transit time on line DU; in principle, however, it would also be possible to control the transmitting end receiving operations of each terminal by a single train of such pulses. For purposes of the present invention, in any event, only the pulses appearing on leads $TXC_1-TXC_n$ are of particular interest.

As further illustrated in FIG. 1, at least one terminal (here the one designated $T_n$) serves as or is directly connected to a telephone-subscriber station including converters for translating analog voice samples into bytes sent via a line PH to modem MD' and for reconverting such voice samples into analog form after receiving them through the same modem from the exchange. As noted above, the allocation of the voice channel of line DU to terminal $T_n$—or to any other station so equipped—is controlled by signalization bits carried in the Δ channel and thus does not create any particular access problem.

Figure 2:
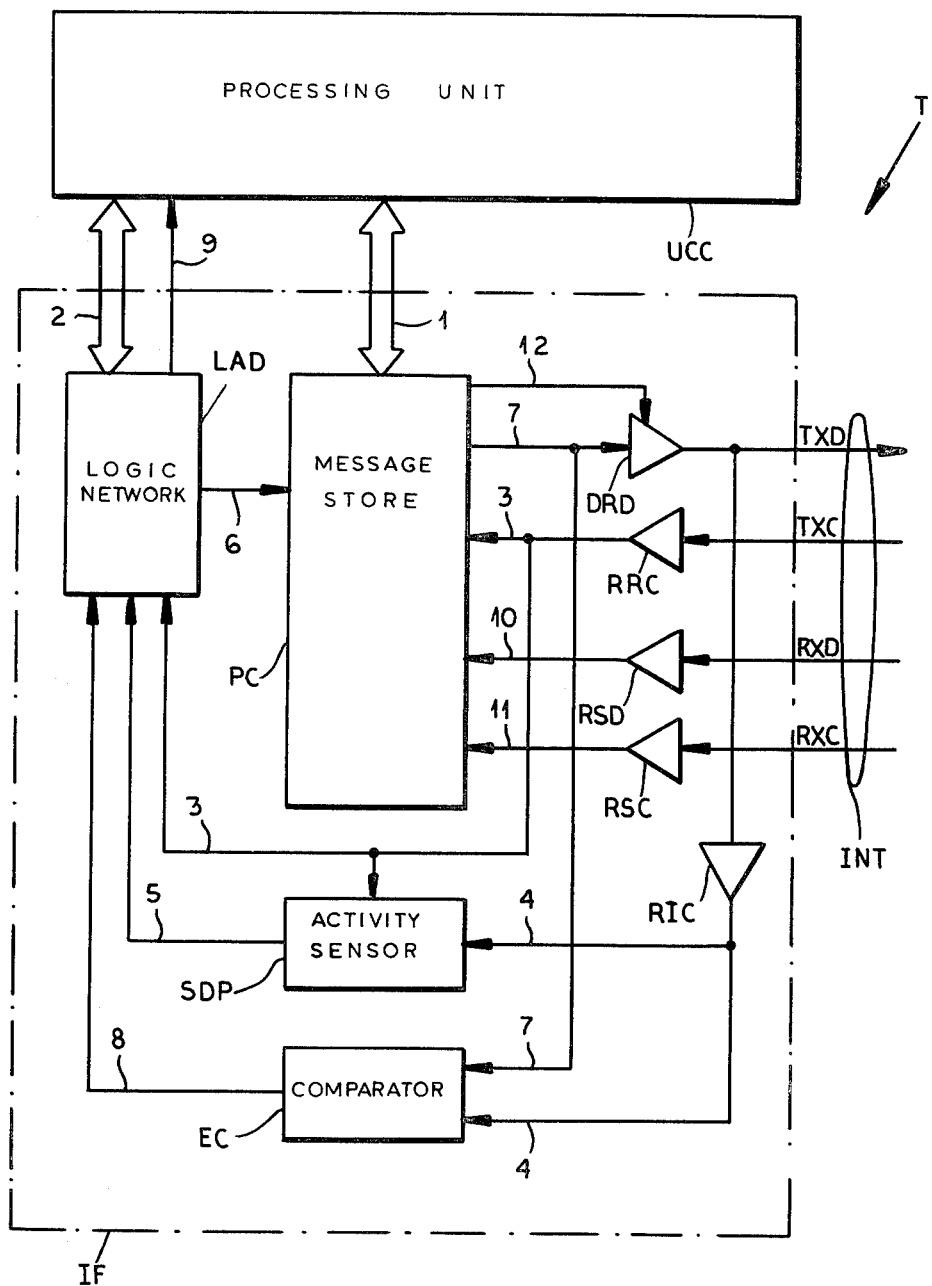
FIG. 2 shows details of an interface forming part of one of the terminals of FIG. 1.

FIG. 2 show a terminal T which, as regards data transmission and reception, is representative of all the terminals $T_1-T_n$ of FIG. 1 and comprises a processing unit (e.g. a microprocessor) UCC and an interface IF connected to generic leads TXD, TXC, RXD, RXC of bus INT. Interface IF has a component PC which communicates with processing unit UCC via a two-way multiple 1 and, insofar as my present invention is concerned, acts primarily as a store for out-going messages received from unit UCC; its other functions include the reception of incoming messages, the comparison of their address codes with that of terminal T and the forwarding of messages destined for this terminal to unit UCC. Thus, the structure of component PC may include two buffer memories and other elements shown in FIG. 2 of the copending application.

A transmitting amplifier or driver DRD, referred to hereinafter as a message transmitter, is inserted in lead TXD which is an extension of an output lead 7 of message store PC; a branch of lead 7 terminates at one input of a comparator EC having another input connected by way of a lead 4 and a receiving amplifier RIC to a point of lead TXD downstream of message transmitter DRD. Lead 4 also has a branch connected to an input of an activity sensor SDP, more fully illustrated in FIG. 4, which has an output lead 5 extending together with a similar lead 8 of comparator EC to a logic network LAD dialoguing with unit UCC through a two-way multiple 2. Signal lead TXC is connected through a receiving amplifier RRC to a lead 3 carrying the transmission-controlling clock pulses to message store PC, to activity sensor SDP and to logic network LAD. The remaining two leads RXD and RXC of bus INT are connected via respective receiving amplifiers RSD and RSC to input leads 10 and 11 of message store PC. A further input of that message store is connected to an output lead 6 of logic network LAD which has another lead 9 extending to processing unit UCC. Message transmitter DRD is blocked in the absence of an enabling signal on an output lead 12 of component PC.

Activity sensor SDP, as shown in FIG. 4, comprises essentially a 7-stage shift register RG which is stepped by the clock pulses on lead 3 during a phase of a time slot allocated to the transmission of data bits; this phase, and an adjoining one carrying the signalization bits, thus constitute the aforementioned Δ channel. The other eight phases of such a time slot, reserved for the eight bits of a digitized voice sample, need not be further considered. An AND gate AG is connected to the seven stage outputs of register RG and works into the lead 5 which thus carries a "line free" signal when all seven stages are occupied by a bit of logical value "1".

Figure 3:
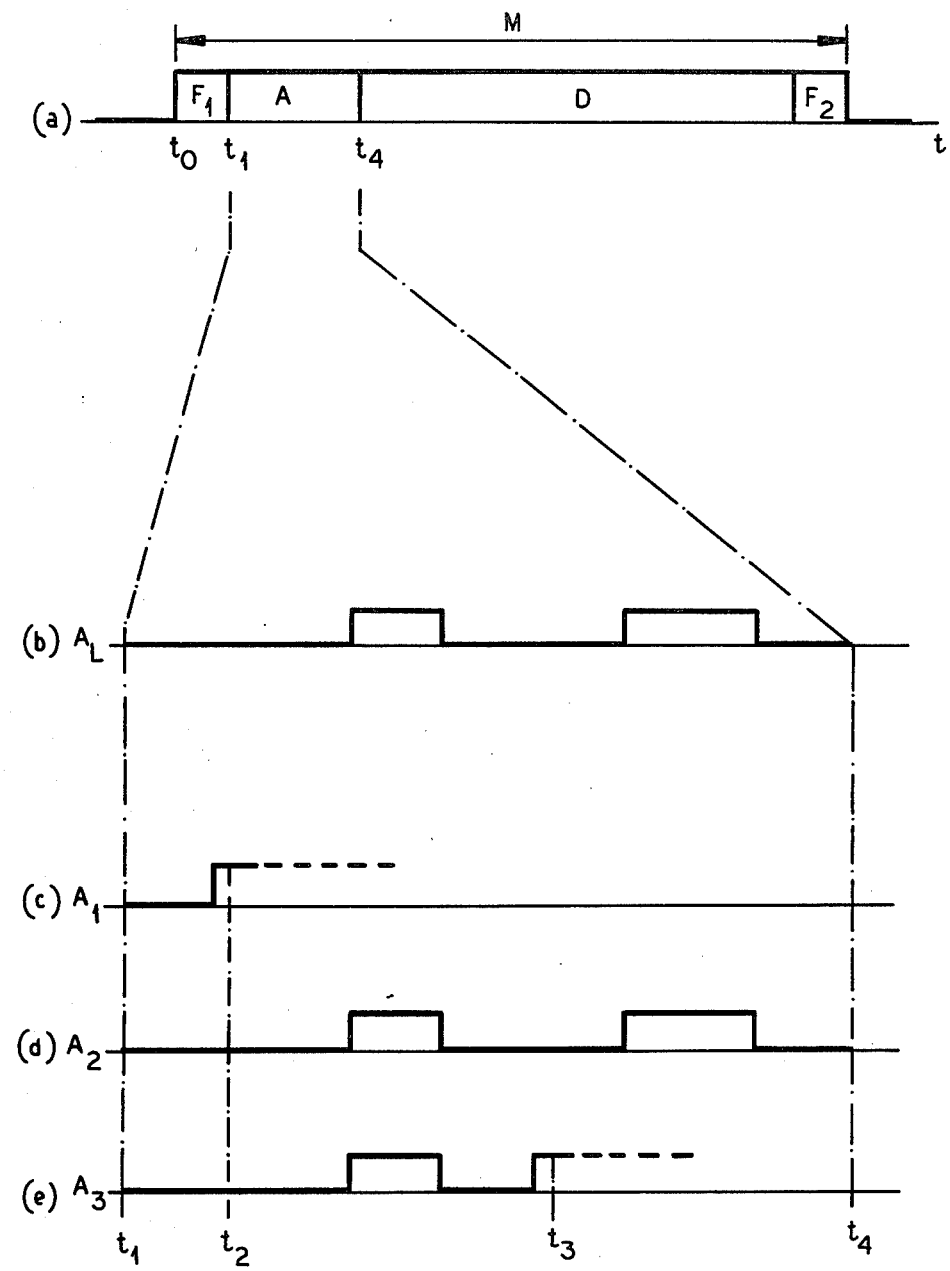
FIG. 3 is a set of graphs relating to the operation of the interface of FIG. 2.

Graph (a) of FIG. 3 schematically represents an outgoing message M stored in the corresponding buffer memory of component PC. A first field of that message, occurring between instants $t_0$ and $t_1$, carries a flag $F_1$ which is identical for all messages emitted by any of the terminals. A multibit address occupies a field A between instants $t_1$ and $t_4$ and is followed by the actual data in field D, the message terminating in a flag $F_2$ constituting a final field. The interval $t_1$–$t_4$, containing an address, is shown expanded in the remaining graphs of this figure.

Whenever the processing unit UCC of any terminal has a message to be sent via line DU to exchange EX, it transmits that message by way of multiple 1 to component PC which stores it together with the local address code in the memory connected to output lead 7. Multiple 1 also carries a command preparing the component PC for the emission of that message. A concurrent command sent via multiple 2 to network LAD instructs the latter to initiate a procedure for gaining access to line DU. These operations are carried out in an asynchronous manner, independently of incoming clock pulses; the following steps however, are timed by the pulses appearing on lead 3. If the state of energization of lead 5 reveals that sensor SDP has found the Δ channel to be free, logic network LAD sends a start signal via lead 6 to component PC which thereupon emits first the flag $F_1$ of the stored message M (FIG. 3) and then begins with the readout of the bits of address A; these bits, appearing on lead 7, are fed to comparator EC as well as to transmitter DRD which is unblocked by an enabling signal on lead 12. If the signal present on lead TXD downstream of transmitter DRD is "0", i.e. if that lead is grounded through the collector of an output transistor forming part of any other such transmitter, the input signals fed to comparator EC will be different from each other if the bit present on lead 7 is of value "1"; under all other circumstances the two signals will be identical. Comparator EC may therefore be designed as an Exclusive-OR gate. When that comparator energizes its output lead 8, network LAD cancels the enabling signal on lead 6 and reports to microprocessor UCC on lead 9 the aborting of the message emission. Such emission can then be retried at a later time.

The three bottom graphs (c), (d), and (e) of FIG. 3 represent significant portions of addresses $A_1$, $A_2$ and $A_3$ of three terminals competing for access to line DU after their respective activity sensors SDP have found the Δ channel to be available. In a first bit period following the starting flag $F_1$, i.e. in an interval between instants $t_1$ and $t_2$, all addresses present on the respective leads 7 have a bit "0" which prevails over the line bit "1" on leads 4 indicative of such availability. The second bit of address $A_1$, emitted at instant $t_2$, has the value "1" and is of lower priority than the concurrently generated bits "0" of the other two addresses so that the terminal identified by address $A_1$ drops out. In the next two bit periods the two remaining addresses have identical bits, yet in the period beginning at an instant $t_3$ the bit of address $A_3$ has the value "1" so that the emission of the corresponding terminal also must be aborted since address $A_2$ simultaneously has a prevailing bit "0". The address eventually sent to the line in its entirety, shown at $A_L$ in graph (b), is therefore that of graph (d) and is followed by the data written into the transmitting memory of message store PC of the corresponding interface.

When the message M has been fully emitted, e.g. as determined by a suitably preset counter in network LAD or component PC which is stepped by the clock pulses on lead 3, this fact is reported to microprocessor UCC which may or may not load the transmitting memory of component PC with another message to be sent out before the line is released. If no further message is to be sent, the microprocessor restores network LAD to normal with termination of the enabling signal on lead 6 and consequent reblocking of transmitter DRD whose output thereafter is a logical "1" if the lead TXD is otherwise ungrounded.

An address complementer of the type described in the copendng application may also be used in my present system to change the priority order of different terminals of like rank so as to equalize their chances of gaining access to the line DU.

It will be apparent that a possible malfunction of any one terminal—except a permanent grounding of lead TXD by a driver DRD—will have no adverse effect on any other terminal using the same line DU.

Since the data bits transmitted in the Δ channel have a low recurrence rate of 8 or possible 16 kbit/sec, differences in transit time between modem MD' and the several terminals will not significantly affect the described operation of the various interfaces.

I claim:

1. A telecommunication system with several terminals equipped for the transmission and reception of data over a line linking said terminals with an exchange, each of said terminals comprising a processing unit communicating with said line by way of an associated interface coupled to said line via a two-way bus including an incoming-data lead, an outgoing-data lead and at least one signal lead carrying clock pulses generated at said exchange, each of said leads having branches extending in parallel to all said terminals, said interface comprising:

activity-sensing means with a data input connected to said outgoing-data lead and with a control input connected to said signal lead for ascertaining the free or busy state of the line from signal levels detected in a predetermined number of consecutive time slots assigned to data transmission;

storage means loadable with an outgoing message from said processing unit and connected to a message transmitter inserted in said outgoing-data lead;

logical circuitry responsive to a command from said processing unit for initiating the emission of a message preceded by an invariable address code, loaded into said storage means, in the presence of a line-free signal from said activity-sensing means, said storage means being controllable by said clock pulses to emit successive bits of said address code in respective time slots before sending out the message; and comparison means with inputs connected to said outgoing-data lead upstream and downstream, respectively, of said message transmitter for detecting a possible coincidence of an emitted address bit with a higher-priority bit from another terminal and halting the emission of further bits by said message transmitter in the presence of such coincidence.

2. A system as defined in claim 1 wherein said activity-sensing means comprises a k-stage shift register with k-stage outputs connected to a coincidence gate for generating said line-free signal in the absence of said higher priority bit in any stage thereof.

3. A system as defined in claim 2 wherein k=7.

4. A system as defined in claim 1, 2 or 3 wherein said higher-priority bit has a logical value of zero.

5. A system as defined in claim 1, 2 or 3 wherein said two-way bus is coupled to said line via a modem also communicating with at least one further terminal by way of a connection adapted to carry digitized voice samples to and from said exchange.

* * * * *